United States Patent [19]
Jerome

[11] Patent Number: 5,735,664
[45] Date of Patent: Apr. 7, 1998

[54] APPARATUS AND METHOD FOR UNLOADING POULTRY FROM MULTILAYER CONTAINERS

[76] Inventor: Wallace H. Jerome, 1480 E. Maple Ave., Barron, Wis. 54812

[21] Appl. No.: 578,170

[22] Filed: Dec. 29, 1995

[51] Int. Cl.$^6$ .................................................. B65G 67/24
[52] U.S. Cl. .......................... 414/393; 119/845; 414/401; 414/411; 414/416; 414/786
[58] Field of Search .................................. 414/390–393, 414/411, 416, 417, 786, 401; 119/843, 845

[56] References Cited

U.S. PATENT DOCUMENTS

| | | | |
|---|---|---|---|
| 1,066,450 | 7/1913 | Pomeroy | 414/467 X |
| 1,657,076 | 1/1928 | Fitch | 414/373 X |
| 1,907,457 | 5/1933 | Stevenson | 414/413 |
| 1,940,193 | 12/1933 | Tucker | 298/13 |
| 2,562,539 | 7/1951 | Ellis et al. | 414/354 |
| 2,626,698 | 1/1953 | Appel | 198/65 |
| 3,110,388 | 11/1963 | Elliott et al. | 119/845 |
| 3,234,915 | 2/1966 | Sanders | 119/97 |
| 3,260,239 | 7/1966 | Sanders | 119/97 |
| 3,782,398 | 1/1974 | Powell et al. | 134/133 |
| 3,863,781 | 2/1975 | Butzow et al. | 414/384 |
| 3,895,727 | 7/1975 | Rucker | 414/537 |
| 4,084,714 | 4/1978 | Williams | 414/498 |
| 4,112,872 | 9/1978 | Van Huis | 119/845 X |
| 4,215,654 | 8/1980 | Parker, Jr. | 119/97 |
| 4,242,029 | 12/1980 | Musgrave | 414/413 |
| 4,272,863 | 6/1981 | Parker, Jr. | 17/44.1 |
| 5,108,345 | 4/1992 | Harben, III et al. | 452/183 |
| 5,288,201 | 2/1994 | Pippin | 414/416 X |
| 5,388,948 | 2/1995 | Jerome | 414/425 |
| 5,466,116 | 11/1995 | Jerome | 414/786 |
| 5,470,194 | 11/1995 | Zegers | 414/416 X |
| 5,505,582 | 4/1996 | Jerome | 414/501 |
| 5,553,988 | 9/1996 | Horn et al. | 414/416 |

OTHER PUBLICATIONS

P. 39 from *Turkey World* (Jan., Feb., 1992) re turkey harvester of Bright Coop, Inc.
Two–page flier of Bright Coop, Inc., on the Bright Poultry Cage.
Two–page flier of Lanson Industries, Inc., on its poultry container.
Four–page brochure on poultry cages of Anglia Autoflow Ltd.
One–page flier on fold–out turkey coops of Koechner Mfg., Co.
Three–page brochure of Carfed on containers sold under its GIANT® brand.
P. 44 of *Broiler Industry* (Oct. 1992) re Cage Dumper of Bright Coop, Inc.
Two–page flier of Tamdev Ltd. on its APS4000 chicken unloading system.

*Primary Examiner*—David A. Bucci
*Attorney, Agent, or Firm*—Merchant, Gould, Smith, Edell, Welter, & Schmidt, P.A.

[57] ABSTRACT

An apparatus and method for emptying a load of multilayer container columns is disclosed. A carriage is aligned in an unloading position relative to a container. The carriage includes a mechanism for opening a gate of the container, a mechanism for extending a container floor out of the container, and a mechanism for urging contents of the container carried by the floor off the floor and onto an unloading receptor when the floor is extended from the container.

28 Claims, 12 Drawing Sheets

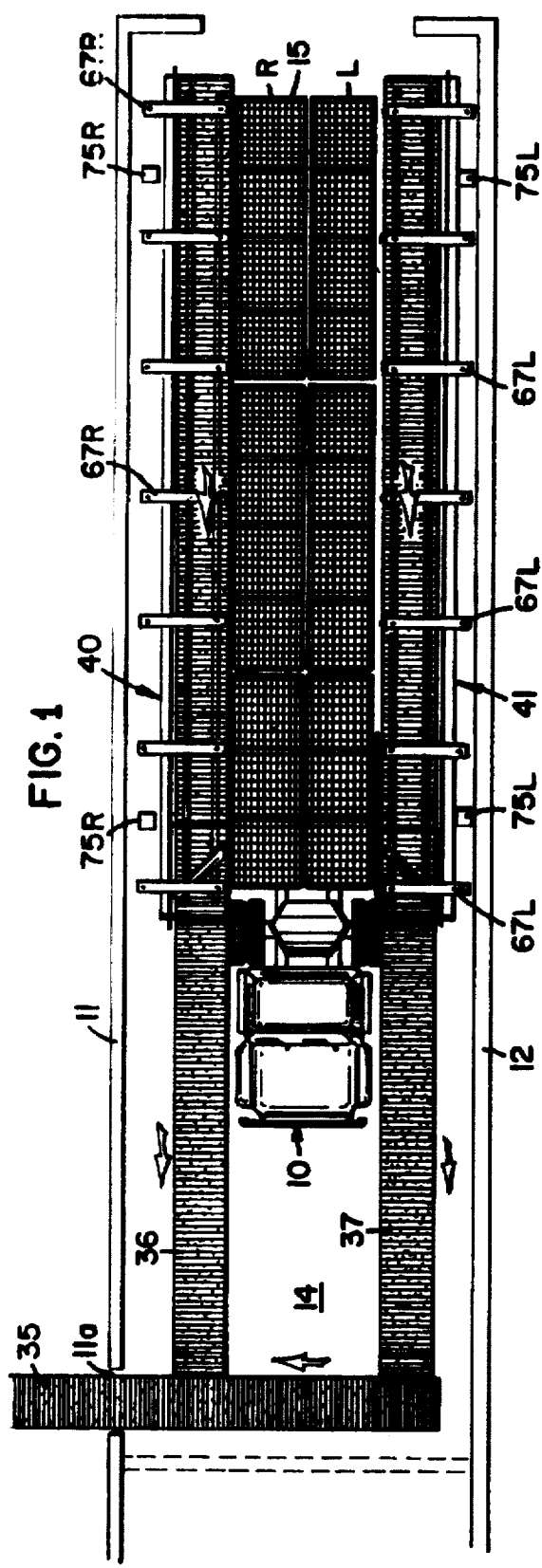
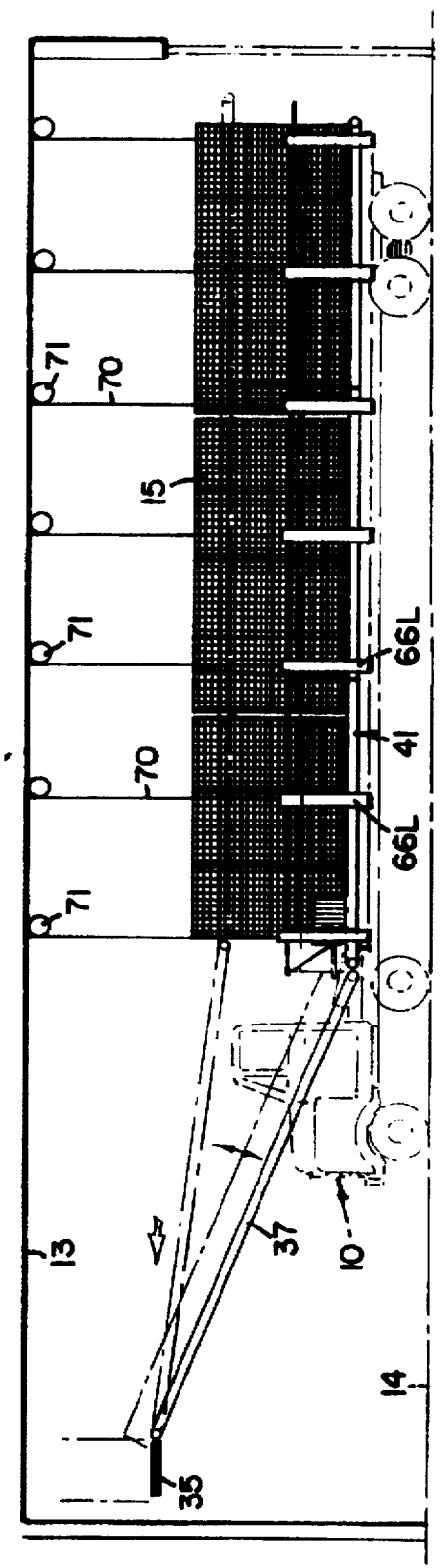

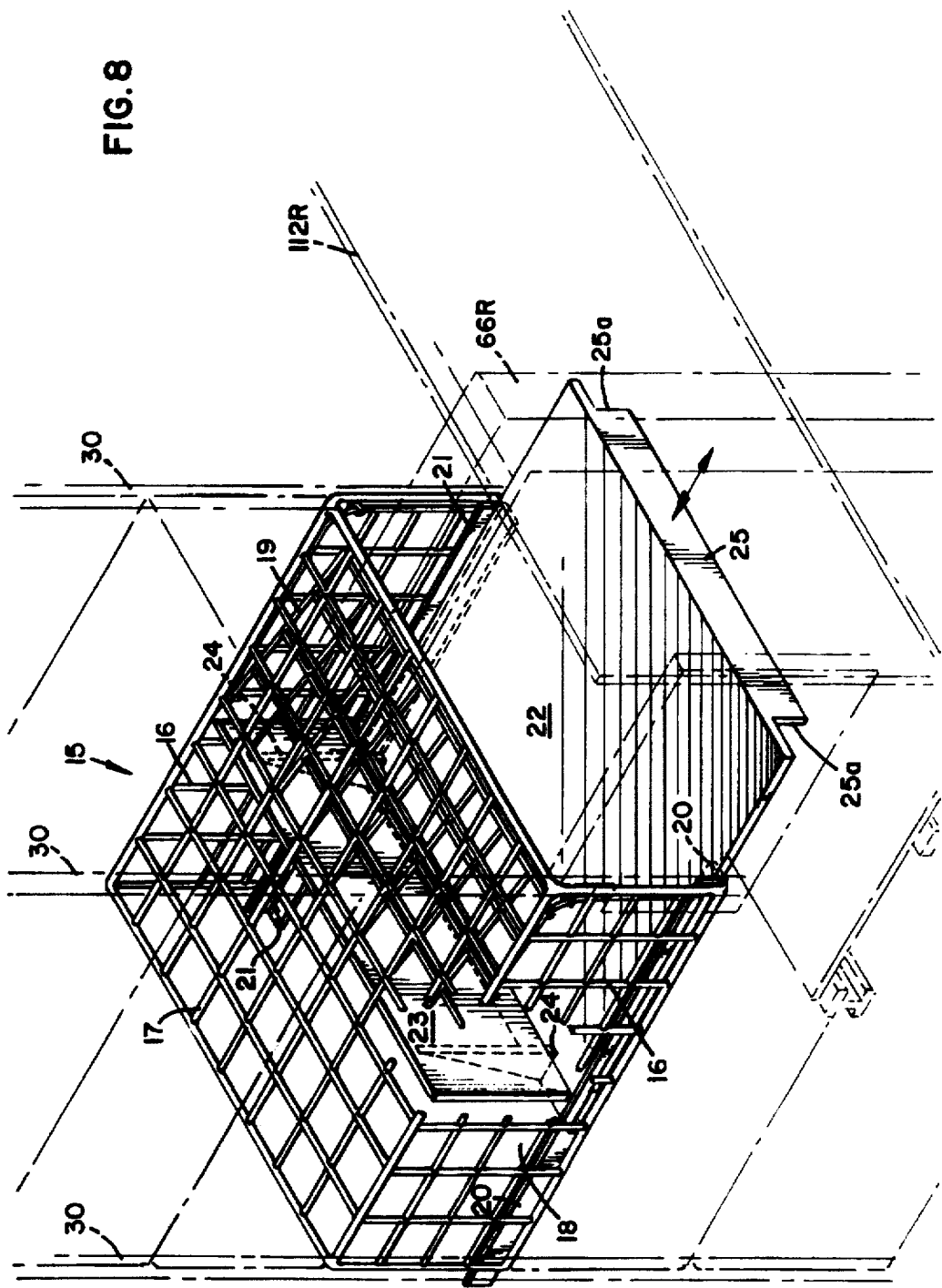

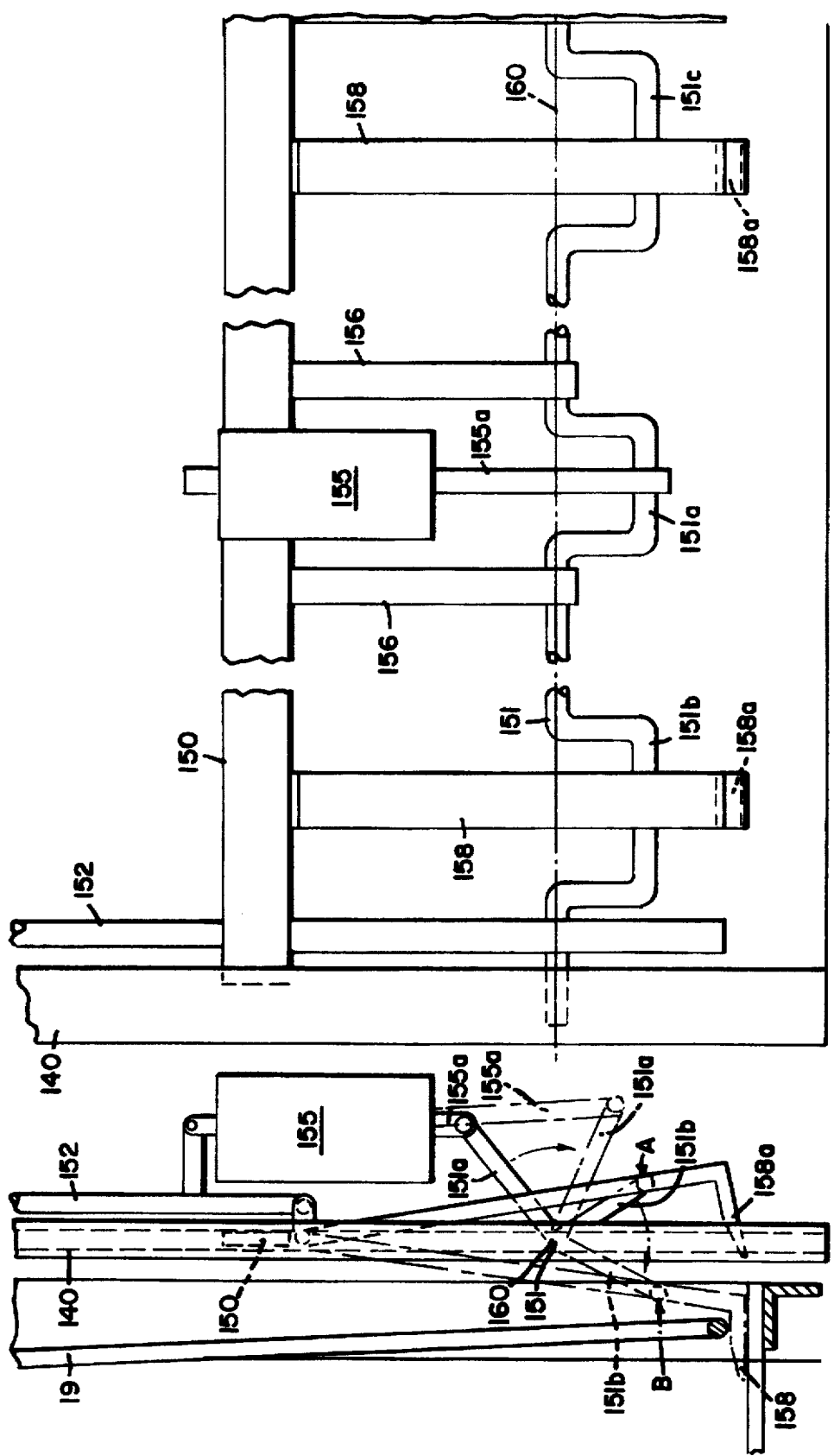

ions of U.S. Pat. Nos. 5,388,948 and
APPARATUS AND METHOD FOR UNLOADING POULTRY FROM MULTILAYER CONTAINERS

CROSS-REFERENCE TO RELATED PATENTS

The disclosures of U.S. Pat. Nos. 5,388,948 and 5,466,116 are hereby incorporated by reference.

FIELD OF THE INVENTION

This invention relates generally to the unloading of contents of multilayer containers, and more particularly to a unique automated process and apparatus for systematically unloading live poultry from a plurality of multilevel coops on a transport truck, with minimal damage to the poultry.

BACKGROUND OF THE INVENTION

Poultry, and in particular turkeys, are typically housed for transport in multilayered cages, coops or containers carried by a large transport vehicle bed such as a flatbed trailer truck. Unloading of the turkeys at, for example, a processing plant, in a systematic manner so as to avoid piling or congestion of the turkeys in the unloading area and so as to avoid damage to the turkeys has long been a problem. The reader will understand that while the invention will hereafter be described with respect to the handling and processing of turkeys from transport trucks, the principles of this invention are not to be limited thereby. The apparatus and unloading processes described in this document and to which this invention pertains could well be applied to the unloading of other types of cargoes.

Live poultry is generally transported to modern processing plants on large flatbed truck trailers carrying the poultry end multilayered cages or coops. A transport truck typically carries as many as 160 coops for chickens, holding approximately 13,200 chickens and as many as 120 coops for turkeys, holding approximately 1,440 turkeys. The poultry cages or coops are normally multilevel, usually 6 levels high for turkeys and up to 12 levels high for chickens.

Those used for transporting turkeys are normally mounted on both sides of the transport truck trailer, with their coop doors or gates facing the outside of the trailer. The multilevel cages generally are stacked from 8 to 10 feet high, are built in sections of 8 to 16 feet long, and are generally about 45 inches in depth, with approximately a 6-inch ventilation air space provided between the coops down the middle of the truck. The doors of such turkey transport coops generally lift up and slide back into the coop at their tops, in overhead door manner.

Unloading of turkeys from their carrying cages or coops of the transport vehicle and into a processing facility, has long been a problem for the processing industry. Such unloading has been very labor intensive, is difficult and often dangerous to the person doing the unloading, is traumatic to the bird being handled, and often results in injury or damage to the bird.

Due to the large size of turkeys, their unloading has generally been performed by or assisted by hand, wherein an unloading person typically opens one coop at a time and individually removes each turkey from its transport cage, either lifting the bird into its confining shackles for processing within the plant, or placing the bird on a conveyor belt leading into the plant for subsequent anesthetizing and handling. Since Tom turkeys generally weigh between 25 and 40 pounds, the unloading task is extremely strenuous, time consuming and difficult—and the turkeys are generally uncooperative in the process. The process can also result in undesirable damage to the turkey, which is accentuated by the fact that larger turkeys are more susceptible to injury if roughly handled.

As described in my prior U.S. Pat. Nos. 5,388,948 and 5,466,116 (herein incorporated by reference), a typical turkey unloading sequence of the prior art, wherein the turkeys are directly placed into shackle-containing conveyors, is very labor intensive and often results in damage and contamination to the turkey carcass which results in downgrading of the carcass quality. My prior patents disclosed automated techniques for unloading turkeys from the stacked coops onto conveyor belts moving into a processing plant, by successively lifting the backs of the turkey coops so as to pivot the coops about their lower front edges, thereby depositing the turkeys from a tilted coop onto an adjacent conveyor belt. The present invention represents an alternative approach to automating the turkey unloading process by providing an automated system which successively empties the contents from coops on the transport truck and onto conveyor belts moving into the processing plant, without requiring the lifting or tipping of any of the coops on the truck. The apparatus and method of this invention enables the transport truck to be systematically emptied by progressively removing the contents of coops, one at a time from each side of the truck, without the necessity of any human intervention, until the truck is completely empty. Moving and urging of the turkeys during the unloading process is performed in a manner which is humane and noninjurious to the turkeys, thereby enhancing their carcass value, and significantly reducing the labor intensive processes typically practiced by prior art techniques, and their high associated costs.

SUMMARY OF INVENTION

This invention provides both an improved method and apparatus for gently, reliably and efficiently unloading poultry, and particularly turkeys, from multilayer loads of turkey coops onto an input conveyor for a poultry processing facility. The invention provides an improved coop configuration which facilitates automated unloading of the transport load of coops. The invention also provides an automated unloading assembly for unloading the coops of the transport load in successive, progressive manner, until all of the coops of the load have been emptied. The unloading operation is accomplished automatically, without the need for any operators of the type previously required to physically unload turkeys from the coops of the transport load, thereby significantly saving on labor at the most costly step of prior unloading processes, and significantly reducing the injury to the unloading operators that inherently resulted from prior unloading operations.

According to one aspect of the invention, there is provided an improved turkey coop suitable for automated unloading, comprising: (a) a top wall; (b) a pair of oppositely disposed side walls; (c) a back wall; (d) a floor oppositely disposed from the top wall, wherein in the floor, top, side and back walls collectively define an internal cavity having an access port opposite to the back wall and opening into the internal cavity; (e) a movable gate; (f) means for operatively mounting the gate across the access port of the coop in opposing relationship to the back wall, for selectively opening and closing access to the internal cavity through the access port; and (g) means operatively mounting the floor for sliding movement relative to the side walls, wherein the floor is slidable in a direction generally perpendicular to the access port, out of and into the coop's internal cavity. According to a further aspect of the invention, the turkey coop has a back member that is operatively connected for movement with the floor and positioned adjacent the rear of the floor, for retaining turkeys carried by the floor, on the floor, as the floor is moved relative to the side walls of the coop. According to yet a further aspect of the invention, the turkey coop includes a pair of oppositely disposed guide members mounted to or adjacent the side walls within the internal cavity of the coop.

According to yet a further aspect of the invention, there is provided a carriage apparatus for unloading turkeys from a transport coop of the type having a movable gate for selectively opening and closing an access port into the coop and a floor slidably movable relative to the coop through the access port, comprising: (a) means for aligning said carriage apparatus in unloading position relative to said coop; (b) mechanical gate opening means for selectively engaging and moving said gate to open and close said access port of said coop; (c) mechanical floor engaging means for engaging and moving said floor out of and into said coop through said coop access port; and (d) mechanical means for urging turkeys carried by said floor off of said floor and onto an unloading receptor when said floor is positioned in an extended manner out of said coop and through said access port. According to a further aspect of the invention, the carriage means includes means for supporting at least that portion of the floor that is moved out of the coop during the unloading operation. According to yet a further aspect of the invention, the carriage apparatus includes a ram movable in a direction transverse to that in which the floor moves, for urging turkeys laterally off of the floor during the unloading operation. According to yet a further aspect of the invention, the carriage apparatus includes an upright divider means operatively disposed generally perpendicular to the floor of the coop being emptied, and configured relative to the coop access port so as to engage a portion of the turkeys carried by said floor as the floor is withdrawn from the coop, for urging the engaged turkeys toward the unloading receptor.

According to yet a further aspect of the invention, there is provided a method of unloading turkeys from a transport coop of the type having an openable gate closing and access port into the coop and a floor slidably removable from the coop through the access port, comprising the steps of: (a) aligning an unloading carriage assembly with the access port of a first coop containing turkeys to be unloaded; (b) opening the gate of said first coop by means carried by said carriage assembly, to open said access port of said coop; (c) engaging and moving the first coop floor in a removal direction through said open access port of the first coop, by means carried by said carriage assembly; and (d) pushing turkeys carried by said moved first coop floor off of the floor and onto an unloading receptor. According to yet a further aspect of the above method, the invention includes the step of moving the first coop floor back through the access port and into the coop once all of the turkeys carried thereby have been removed from the floor and onto the unloading receptor. According to yet a further aspect of this method, there is included the step of moving the unloading carriage assembly for alignment with the access port of a second coop containing turkeys to be unloaded after the floor of the first coop has been moved back into the first coop, for repeating the process and unloading turkeys from a second coop of a transport load.

According to yet a further aspect of the invention, there is provided a turkey unloading apparatus for automatically unloading turkeys from a transport load of turkey coops stacked in ordered rows and columns, wherein the coops are of the type having a movable gate for selectively opening and closing an access port into the coop and a floor slidably movable relative to the coop through the access port, wherein the unloading apparatus comprises: (a) a conveyor apparatus having an unloading conveyor extending generally the length of the rows of coops comprising the transport load; (b) conveyor positioning means operatively connected with said conveyor apparatus for selectively raising and lowering said conveyor apparatus relative to the height of said transport load; (c) a movable carriage assembly operatively connected to said conveyor apparatus and longitudinally movable therealong, said carriage assembly comprising: (i) transport means for movably supporting said carriage assembly on said conveyor apparatus; (ii) means operatively connected with said transport means for aligning said carriage assembly in unloading position relative to a selected coop of said transport load; (iii) gate opening means for selectively engaging and moving said gate to open and close said access port of said selected coop; (iv) floor engaging means for engaging and moving said floor out of and into said selected coop through said coop access port; and (v) mechanical means for urging turkeys carried by said selected coop floor off of said floor and onto said unloading conveyor, when said floor is positioned in an extended manner out of said coop and through said access port thereof. The invention described in the above apparatus may further include said carriage assembly means for supporting the floor being configured so as to overlie the unloading conveyor in spaced manner.

Yet a further aspect of the invention comprises a method of automatically unloading turkeys from a transport load of turkey coops stacked in ordered rows and columns, said coops being of the type having a movable gate for selectively opening and closing an access port into the coop and a floor slidably movable relative to the coop through the access port, said method comprising the steps of: (a) vertically positioning a conveyor apparatus having an unloading conveyor extending generally the length of the rows of coops, such that an upper surface of the unloading conveyor is disposed adjacent to the access ports of selected row of coops to be unloaded, and slightly below the general planes of the floors of the coops of said selected row; (b) moving an unloading carriage assembly longitudinally along the conveyor apparatus and into unloading proximity with a first one of the coops in said selected row of coops to be unloaded; (c) opening the gate of said first coop by means carried by said carriage assembly, to open said access port of said first coop; (d) engaging and moving the coop floor of said first coop in a removal direction through said open access port by means carried by said carriage assembly; and (e) pushing turkeys carried by said moved floor of said first coop off of said floor and onto said unloading conveyor. The invention further includes the steps of selectively and successively moving the unloading carriage assembly and the conveyor apparatus so as to successively unload the turkey coops of a transport load one coop at a time, until an entire row is emptied, and then moving the conveyor apparatus to a next successive row, and emptying all of the coops of that row one at a time, etc., until all of the coops of the transport load have been emptied onto the unloading conveyor.

These and other features of the invention will become obvious to those skilled in the art, in view of a more detailed description thereof.

BRIEF DESCRIPTION OF THE DRAWING

Referring to the Drawing, wherein like numerals represent like parts throughout the several views, FIG. 1 is a diagrammatic top view of an unloading station at a turkey processing plant of the type to which this invention pertains, illustrating how a transport truck is positioned for unloading its contents, and generally illustrating the positional relationship of the unloading apparatus of this invention relative to the transport truck;

FIG. 2 is a diagrammatic view in side elevation of the transport truck and unloading assembly of FIG. 1;

FIG. 8 is an enlarged perspective view of a coop from the transport truck which is being unloaded, illustrating the floor of the coop as it would appear when partially pulled out of the coop gate;

FIG. 9 is an enlarged view (with portions thereof broken away) of the lower coop gate opening apparatus of the carriage assembly of FIG. 4;

FIG. 10 is a view of the lower gate opening apparatus of FIG. 9, as viewed from the left end thereof, illustrating two operative positions of the gate engaging lever and activating cylinder therefore;

DETAILED DESCRIPTION OF THE PREFERRED EMBODIMENT

Figure 3:
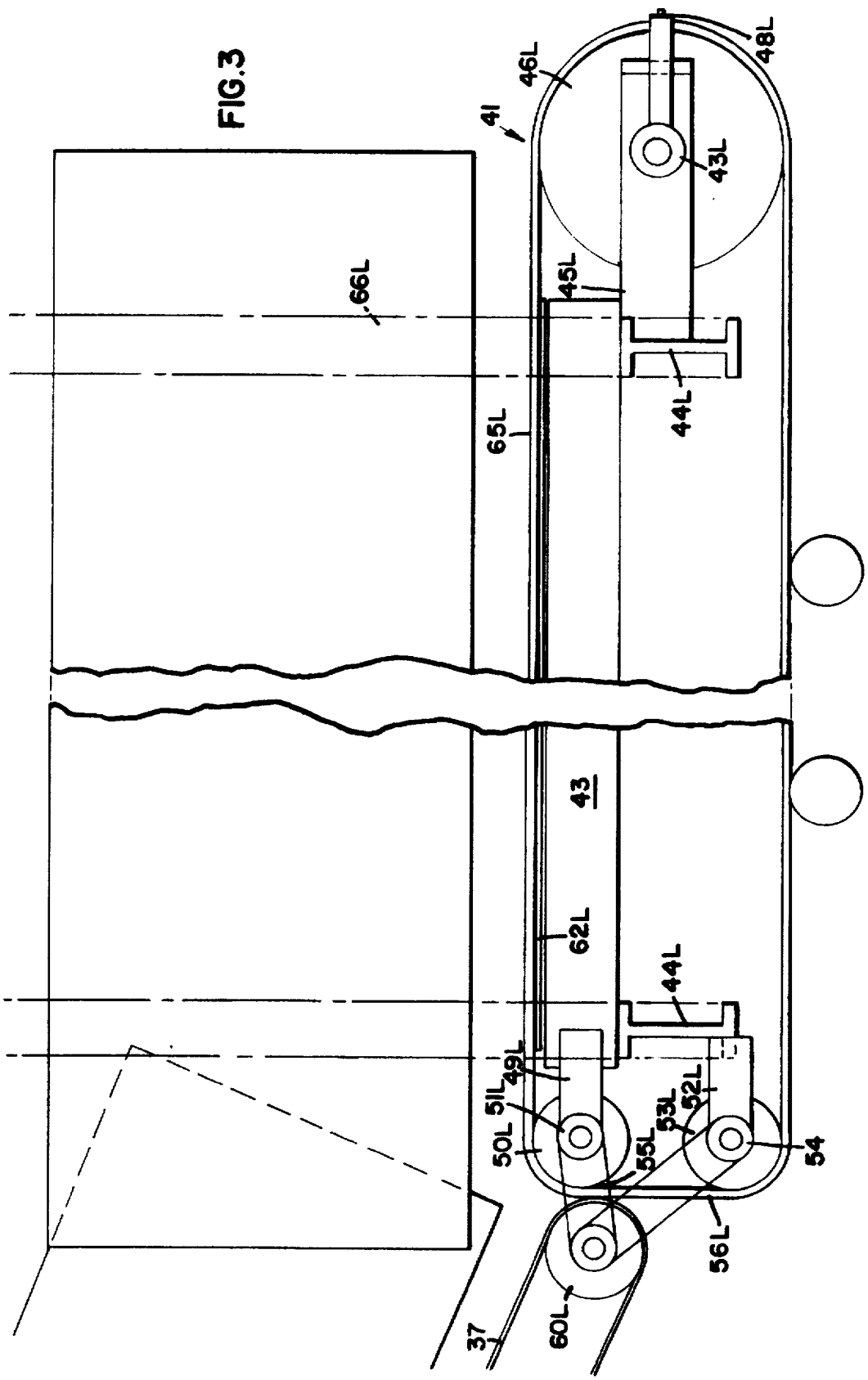
FIG. 3 is a diagrammatic side elevational view, with portions thereof broken away, illustrating one of the conveyor belt unloading assemblies illustrated in FIGS. 1 and 2.

As discussed above, while the present invention could apply to the unloading of any type of material or animal suitable for transport within a plurality of vertical multilayer containers, cages or coops, the invention will be described with respect to its preferred embodiment application of sequentially and systematically unloading turkeys from a plurality of multilayer columns of transport coops. Referring to FIG. 1, a flatbed transport truck of the type often used to transport turkeys to a processing plant, is generally illustrated at 10. The trailer bed or deck of the truck carries a plurality of multilayer turkey cages or coops, generally illustrated at 15 that are arranged in two rows (left "L" and right "R") extending in parallel fashion from the front to the rear of the trailer bed respectively. Each of the two rows of coops is divided into a plurality of multilayered and aligned vertical columns of coops in the manner generally described in my prior referenced patents. In the preferred embodiment, the coops 15 are stacked six high, making six layers of coops requiring emptying at the processing plant. The coops are generally constructed in module configuration with each module containing from three to four vertical columns or stacks of coops connected together by means of appropriate framing structures. For example, in FIGS. 1 and 2, the left and right foremost coop modules on the truck bed each contains three columns of coops stacked six high, yielding a module of 18 coops; whereas the two sets of rearmost modules contain four columns of six-high stacked coops, yielding modules of 24 coops. In the preferred embodiment, each coop is approximately 4 feet wide (in the longitudinal direction of the truck bed), 45 inches deep (in the width direction of the truck bed), and from 14 to 16 inches in height. The left "L" and right "R" rows of coops are typically separated at their "back" ends along the center of the truck by approximately 6 inches, to allow ventilation between the two rows of stacked coops.

Each of the coops has top 17, bottom 18 and side wall 16 members appropriately formed from a wire mesh material (having 1 inch×2 inch mesh openings in the preferred embodiment) and a front mesh gate member 19 mounted for sliding pivotal motion in overhead-door manner relative to the front of the coop, such that when in an "open" position, the coop door or gate lies generally parallel to and in close proximity with the top mesh portion of the coop, as illustrated in FIG. 8. A more detailed description of the general operation of such coop assemblies can be found in my prior referenced patents, and will not be detailed herein. Each coop further includes a pair of oppositely disposed L-shaped channel guide members 20 and 21 longitudinally extending along the inner lower portions of the coop 15. A solid bottomed floor member 22 is slidably received between and supported by the left and right channel guides 20 and 21, such that the floor 22 can be longitudinally moved into and out of the coop door opening in the direction indicated by the arrow in FIG. 8. The floor assembly 22 includes an upright back 23 mounted for unified movement with the floor 22 by appropriate framing and support gusset structures, generally indicted at 24 in FIG. 8. In the preferred embodiment, the upright back portion 23 of the floor assembly 22 is physically spaced from the planar surface of the floor 22 by several inches, in order to enable ready cleaning of debris and fecal matter from the floor by washing or spraying operations. The front edge of the floor assembly 22 has a downwardly projecting lip portion 25 which is notched at its outward lateral edges at 25a, and serves as a handle or pull member for sliding the floor assembly out of and into the coop 15 through the gate end of the coop when the gate is lifted in its raised or open position as indicated in FIG. 8. In the preferred embodiment, the coop floor 22 is preferably of plastic material which facilitates cleaning; however, it will be understood that other materials could equally well be used. The coops are supported in their stacked module orientation by means of a plurality of upright corner post members, generally indicated at 30 and by cross-bracing support members (not illustrated) extending transversely from side-to-side and from front-to-back between the upright corner posts 30 in a manner well-known in the art, in order to provide a structural support framework for the stacked coop modules.

FIGS. 1 and 2 generally diagrammatically illustrate the positioning of a transport truck during an unloading operation, relative to the unloading apparatus of this invention. For a more detailed description of the general description of a processing plant into which turkeys unloaded from the transport truck pass, the reader is referred to my prior referenced patents. In general, for the purposes of the following description, the unloading station into which the transport truck moves includes a pair of longitudinal side walls (11 and 12) in FIG. 1, an upper ceiling 13 and a floor 14 which may include wheel guide members (not illustrated) in order to accurately position the truck and its turkey coop load in lateral alignment relative to the turkey unloading assemblies to be hereinafter described. As illustrated in FIGS. 1 and 2, the sidewall 11 includes an access port 11a into the processing facility through which the unloaded turkeys pass for further processing within the plant. An elevated conveyor 35 carries the unloaded turkeys through the plant access port 11a into the plant. A pair of incline conveyors 36 and 37 connected to and mounted generally perpendicular to the elevated conveyor 35 carry turkeys unloaded from the coops by means of the automated unloading assemblies and deposit the unloaded turkeys onto the conveyor 35. The incline conveyors 36 and 37, as well as the elevated conveyor 35 each has associated therewith appropriate side walls (not illustrated) for maintaining turkeys carried by the respective conveyors on the conveyor surfaces during transport. The conveyor 35 is elevated above the height of the cab and stacked coop portions of the transport truck 10, such that the transport truck can simply drive in a forward manner under the elevated conveyor 35 following the unloading operation.

The unloading apparatus of the present invention includes a pair of conveyor platform assemblies generally indicated at 40 and 41 in FIG. 1 in their respective relationship as they address the right ("R") and left ("L") sides of the turkey coop load carried by the transport truck. The right and left 40 and 41 conveyor platform assemblies are identical to one another and a mirror image construction relative to one another for unloading respectively the right and left rows of stacked coop modules of the truck. Accordingly, it is only necessary to describe one of the conveyor platform assemblies, it being understood that the other operates in an identical but opposite manner to that of the described assembly. For ease of description, when the same reference number is used to indicate components of either the left or the right conveyor assemblies, where such components appear in specific left or right assembly drawings, their reference numbers will be followed by an appropriate "L" or "R" designator.

Accordingly, referring to FIG. 3, a diagrammatic view of the left conveyor platform assembly 41 is illustrated. The conveyor assembly 41 includes a plurality of longitudinally extending I-beam support members 43. In the preferred embodiment, there are three such longitudinal support members 43 extending approximately 45 feet in length, and interconnected by transverse cross-beam members 44 secured to the lower surfaces of the longitudinal support members 43 at their respective ends, and at approximately 8 foot intervals therebetween. The interconnected longitudinal support members 43 and cross-beam supports 44 form an unified lower support frame for the conveyor platform assembly 41. A first conveyor pulley roller 46 is mounted for rotation between a pair of pulley support frame extensions 45 extending in the longitudinal direction from the longitudinal end cross-beam support members 43 and 44 (as illustrated in FIG. 3). The pulley roller 46 is appropriately mounted to the pulley support frame members 45 by appropriate bearing and shaft assemblies, generally indicated at 47 and an associated belt tightening assembly 48, in a manner well-known in the art. At the opposite or forward end of the left conveyor platform module 41, a second conveyor pulley 50 is mounted by means of a pair of pulley support frames 49 secured to the longitudinal support members 43. The second conveyor pulley 50 is appropriately mounted for rotation by means of a pulley shaft and bearing assembly, generally indicated at 51. A third conveyor idler pulley 53 is mounted by means of a pair of pulley support frame members 52 and pulley bearing and shaft assemblies 54 to the lower cross-bar support frame member 44 near the forward end of the conveyor platform assembly 41 as indicated in FIG. 3. A pair of interconnecting mounting arms 55 and 56 connect the pulley support frames 49 and 52 respectively of the second and third conveyor pulleys 50 and 53 to a drive pulley 60 of the incline conveyor assembly 37. The conveyor pulley 60 is rotatably energized by means of an electric motor 311 (not illustrated in FIG. 3) for moving the incline conveyor belt 37 in a counterclockwise direction about the mounting shaft of the pulley 16 as illustrated in FIG. 3. The conveyor pulleys 50 and 53 located adjacent the forward end of the conveyor platform assembly 41 are commonly powered by an electric motor 307 for rotation of the pulleys 50 and 53 in a counterclockwise direction about their mounting shaft as illustrated in FIG. 3. Also, the larger conveyor pulley 46 located near the rear portion of the conveyor platform assembly 41 is also powered for rotation by an electric motor 307 for rotating the pulley 46 in a counterclockwise direction as illustrated in FIG. 3. A conveyor platform 62 is mounted to the top surfaces of the longitudinal support beams 43 and forms a support surface for a continuous 3 foot wide conveyor belt 65 that is entrained for motion about the conveyor pulleys 46, 50 and 53. In the preferred embodiment, the platform 62 is approximately 45 inches wide and is made of fiberglass or plastic material and provides support for a carriage assembly which longitudinally moves along the platform, as hereinafter described in more detail.

Figure 6:
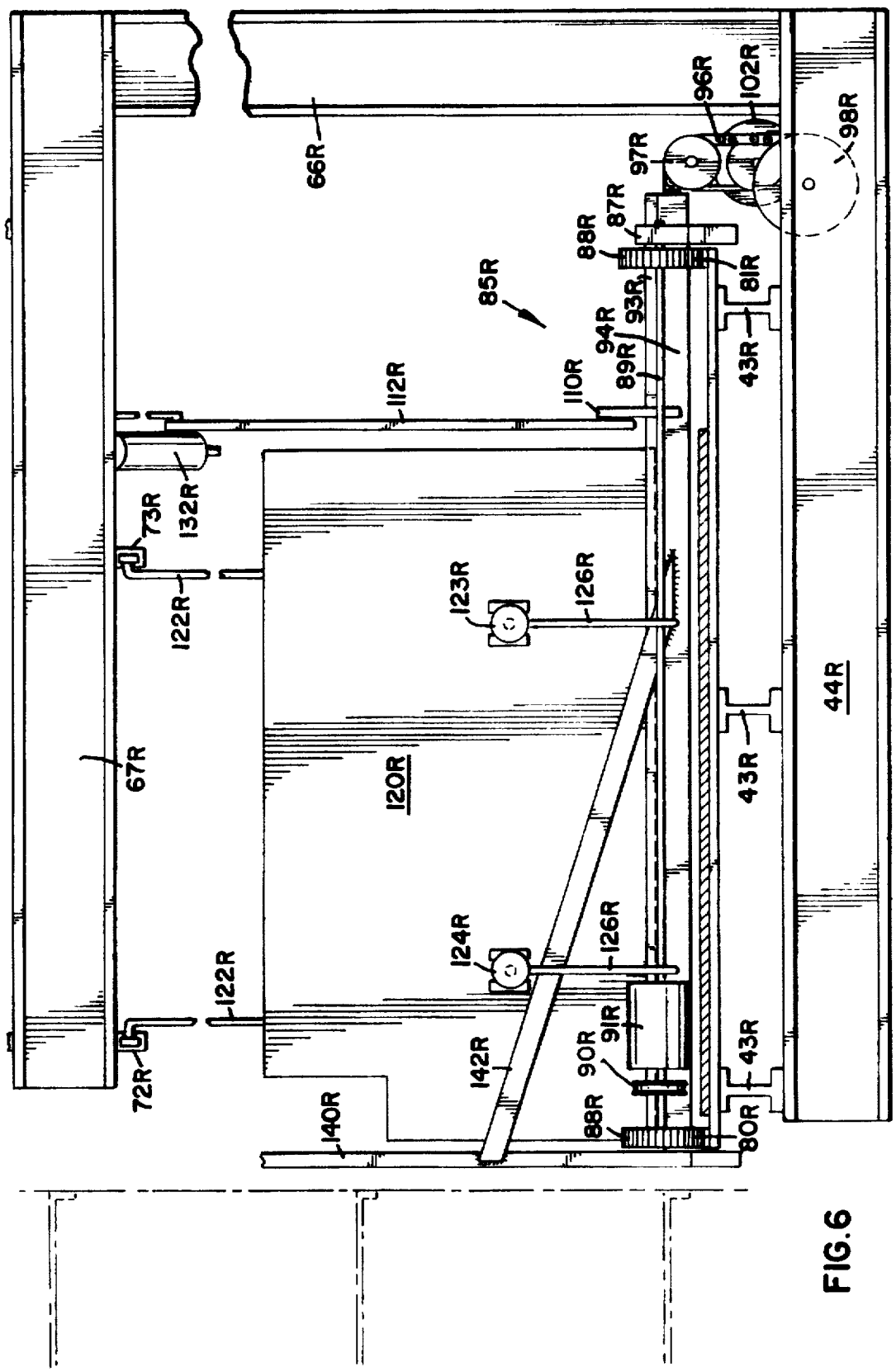
FIG. 6 is an elevational view taken from the left end of the carriage assembly illustrated in FIGS. 4 and 5.

The conveyor platform assembly 41 includes a plurality of vertical support beams 66 welded to each of the lower cross beam supports 44 at the ends of the conveyor platform module and at 8 foot intervals therebetween. The vertical support beams 66 are extend upwardly approximately 5 feet in length, and each supports a transverse cross brace member 67 in cantilevered manner, as illustrated in FIG. 6. The upper cross brace supports 67 are approximately 44 inches in length, and terminate at their distal ends at a position so as to be spaced from the "front" edge of the conveyor platform assembly 41, so as not to engage or interfere with the coops carried by the transport truck. The framework structure formed by the longitudinal support members 43 and the cross beam supports 44, the upright support 66 and the upper cross brace supports 67 defines a unified integral assembly that can be raised and lowered from the ceiling 13 of the unloading station such that the conveyor belt 65 and the entire conveyor platform assembly 41 can be simultaneously raised and lowered relative to the truck 10 and its coops, for unloading the coops, as hereinafter described. The cross brace support beams 67 are connected by means of cable or chain assemblies (generally indicated at 70) and appropriate lift motors 71 and counterbalanced lift assemblies (not illustrated but well-known in the art) to provide accurate vertical lifting movement of the entire conveyor platform assembly 41 relative to the stacked coop assemblies on the truck 10.

The upper cross brace support members 67 carry a pair of longitudinally extending trolley track channels 72 and 73 (best illustrated in FIG. 4) mounted in fixed parallel spaced relationship to one another. The trolley track channels 72 and 73 support movable devices associated with the carriage assembly that unloads turkeys from the stacked coops, as hereinafter discussed in more detail. FIGS. 4–7 generally view the coop unloading assemblies as they relate to the right conveyor assembly 40.

The entire conveyor platform assembly 41 is also transversely movable toward and away from the outer edge of the truck bed, and therefore toward and away from the stacked coop assemblies by means of appropriate hydraulic cylinder alignment assemblies, connected to and carried by the frame support structure of the conveyor platform assembly or alternatively connected to the walls 11 and 12 of the unloading station, and generally indicated at 75L and 75R in FIG. 1. As the truck is driven into the unloading bay of the assembly plant, the hydraulic cylinder placement assembly 75 will withdraw the conveyor platform modules 40 and 41 from the path of the entering truck. Once the truck has been properly positioned between the conveyor platform assemblies 40 and 41, and is ready for an unloading operation, the cylinder 75 assemblies will transversely move the conveyor platform assemblies 40 and 41 inwardly toward the stacked coop assemblies carried by the transport truck, until the conveyor platform assemblies 40 and 41 are in operative unloading position relative to the coops to be unloaded. The lift motors 71 and associated counterbalanced winch assemblies will then raise or lower the entire conveyor platform assemblies 40 and 41 to the desired height in order to unload an entire level of the coops addressed by such conveyor platform assemblies (as hereinafter described in more detail).

Figure 4:
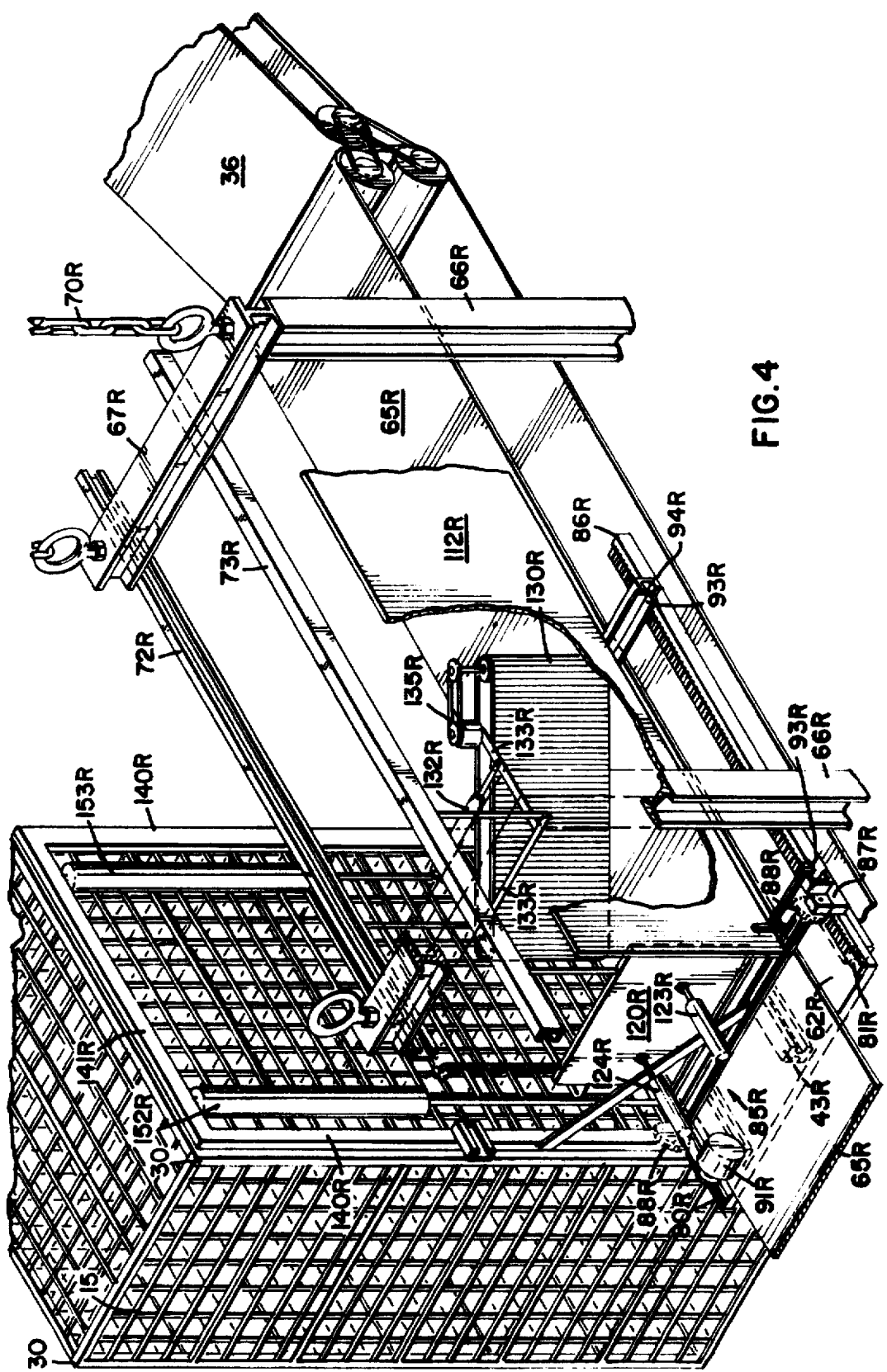
FIG. 4 is a partial perspective view, with portions thereof broken away, illustrating one of the two carriage assembly portions of the unloading apparatus of the present invention (diagrammatically illustrated in FIG. 1)
Figure 5:
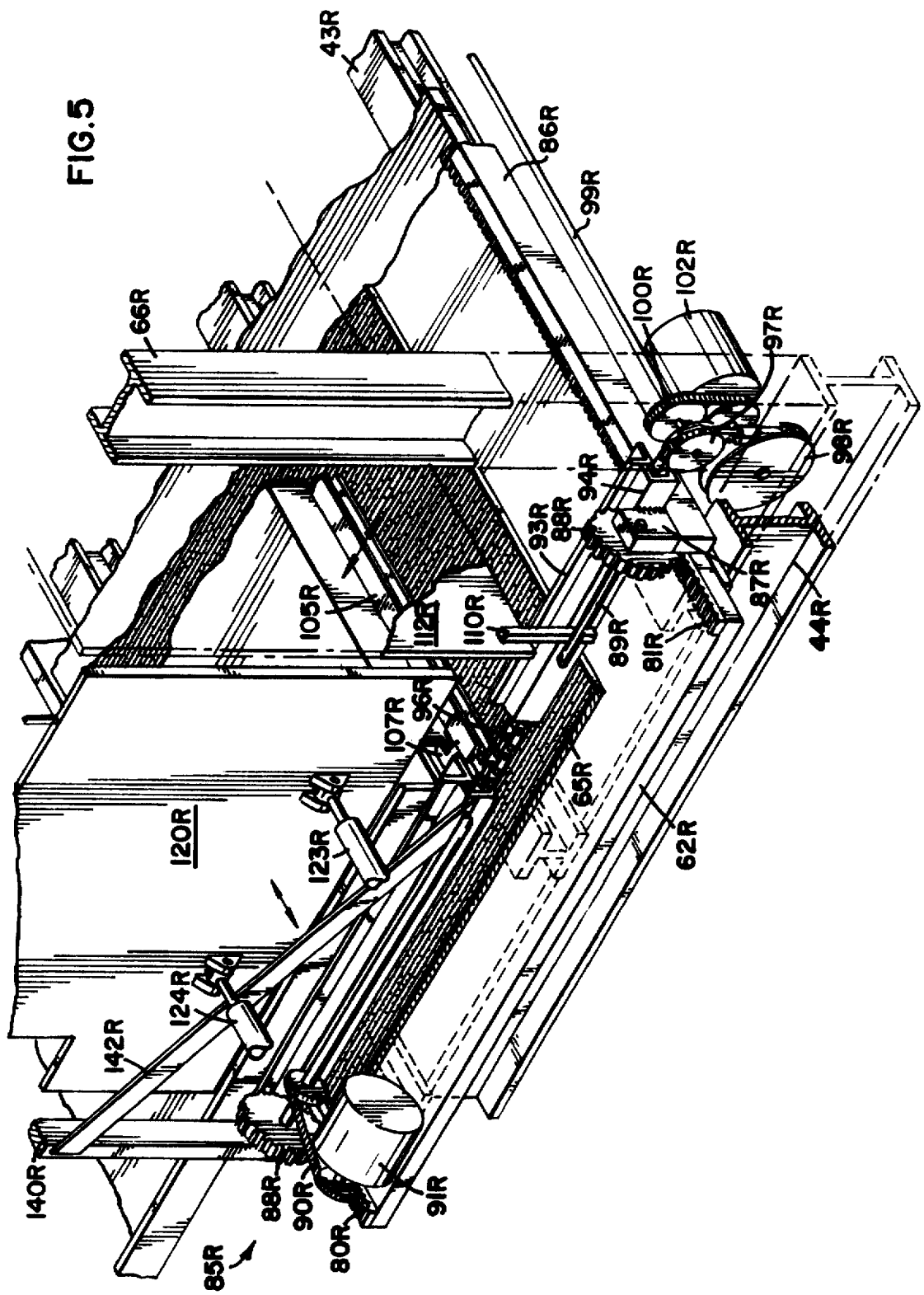
FIG. 5 is an enlarged perspective view of a portion of the left portion of the carriage assembly illustrated in FIG. 4, illustrating component portions thereof in more detail relative to a coop to be unloaded and to the conveyor belt assembly upon which the carriage rides.

The platform 62 includes a pair of gear track strips 80 and 81 secured to the upper surface of the platform 62 and longitudinally extending along the outer upper edges of the platform 62, as illustrated in FIG. 5. The gear track strips 80 and 81 matably mesh with four pinion wheel assemblies, hereinafter described, of a movable carriage assembly, generally indicated at 85. The support framework for the movable carriage 85 includes a pair of front and rear frame members 86 (only the rear one of which is illustrated in FIGS. 4 and 5) which extend in the longitudinal direction of the platform 62 and are mounted in underslung manner such that their upper surfaces are below the upper surface of the platform 62 (see FIG. 5). A plurality of wheel support bearing block members 87 are welded to the opposite ends of the front and rear frame members 86 and extend upwardly therefrom above the upper surface of the platform 62 for rotatably mounting a plurality of pinion wheels 88. The pinion wheels 88 are configured to matingly engage and travel along the two gear track strips 80 and 81. In the preferred embodiment, the pinion wheels 89 and their associated gear track strips 80 and 81 are made from nylon material. The set of pinion wheels 88 illustrated in FIG. 5 and mounted to the left end of the carriage assembly are innerconnected for common movement by means of a drive shaft 89. A drive pulley and belt assembly, generally indicated at 90 in FIG. 5, is operatively connected with an electric motor 91 for rotatably driving the drive shaft 89 and its connected pinion wheels 88. The pinion wheels mounted by means of the wheel bearing block members 87 at the right end of the carriage assembly 85 are not interconnected to one another, but simply travel along the gear track strips 80 and 81 for guiding the right end of the carriage assembly therealong. The pinion wheel and mounting block assemblies carry the weight of the movable carriage assembly 85, which in turn is supported by the platform 62 through the gear track strips 80 and 81.

Figure 7:
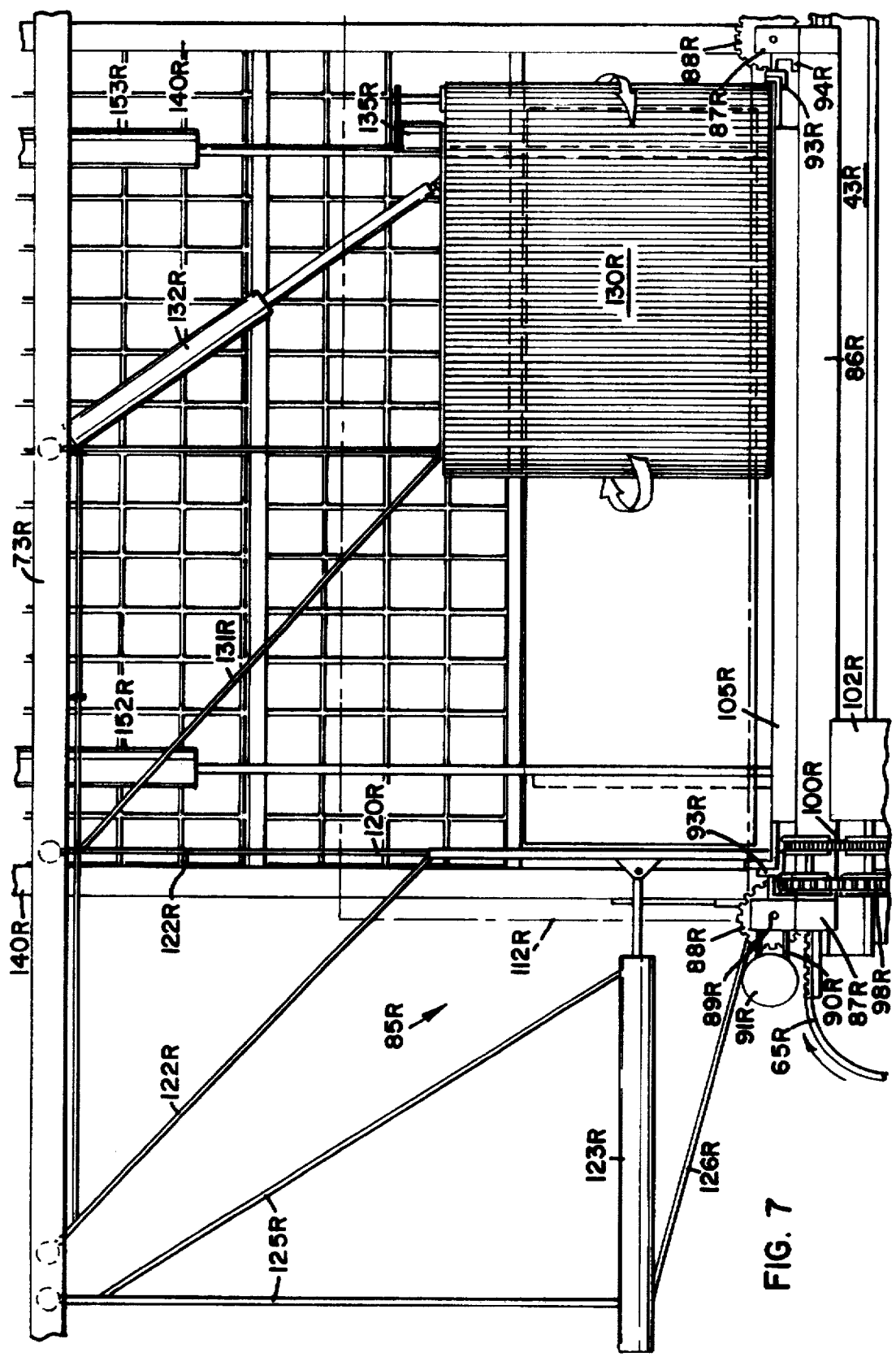
FIG. 7 is a back elevational view of the carriage assembly of FIGS. 4–6, illustrating the carriage assembly as it would appear when looking toward the gate of a coop that is to be unloaded.

The front and rear frame members 86 of the movable carriage assembly 85 are interconnected above the upper surface of platform 62 and above the movable conveyor belt 65 carried thereby by means of a pair of L-shaped channel members 93, which are welded to the front and rear frame members 86 in opposed parallel facing manner, as indicated in FIGS. 4 and 5. The channel guide members 93 are spaced identically with the spacing separating the channels 20 and 21 of the coops 15, and are operative to slidably supportively receive and guide the coop floor 22 therealong when the floor is slid out from the coop by the carriage assembly during a coop unloading operation. Plastic or teflon slide inserts may be placed on the surfaces of the coop channel guides 20 and 21, as well as on the surfaces of the movable carriage L-shaped channel members 93 to reduce friction between such channel guide members and the coop floor 22, for facilitating sliding of the coop floor relative to such guide members. A pair of C-channel support bars 94 are also welded to the front and rear frame members 86 of the carriage assembly 85 as well as to the L-shaped channel members and along with the front and rear frame members 86 and the L-shaped channel members 93, complete the lower frame structure for the movable carriage assembly 85. The C-channel support members 94 are mounted such that their longitudinal slots face one another in opposing manner, as illustrated in FIGS. 4, 5 and 7. Each of the C-channel support members 94 are sized and configured to retainably guide and carry a roller chain 96 within the longitudinal internal cavity defined by the C-channel member. The roller chain is of a heavy-duty type which can both be pushed and pulled within the channel members 94, for exerting forces in both longitudinal directions of the chain as constrained by the channel support members 94. Each of the roller chains 96 is entrained as it exits from the rear end of its associated C-channel support 94 (as illustrated in FIG. 5) over a drive pulley 97 and into a spring biased take-up reel assembly, generally indicated at 98. The pair of drive pulleys 97 are interconnected by means of a drive shaft 99 for common drive movement. The drive shaft 99 is connected by means of a drive pulley and belt configuration generally indicated at 100 for energization by an electric motor 102. The motor 102 and associated drive pulley and shaft assembly 100 is mounted to the lower frame structure of the movable carriage 85, for movement therewith.

The foremost ends of the two roller chains 96 are welded by their inner sides to a floor puller bar member 105 that extends between and is carried by the forward ends of the roller chains 96 as they travel in unison within their C-channel supports 94. Connection of the floor puller bar 105 to the chains 96 is maintained through the longitudinal slots formed by the C-channel support members 94 as the puller bar 105 moves in a transverse direction relative to the platform 62 as indicated by the double-sided arrow in FIG. 5. The length of the floor puller bar 105 is sized so as to connect to the spaced roller chains 96 and to operatively move between the C-channel support members 94. The floor puller bar member 105 is configured to form upper and lower plate portions (see FIG. 11) which provide a mounting bearing for a pair of floor engagement hook members 107. Each of the hook members 107 is pivotally mounted at one end to the upper and lower plate portions of the floor puller bar member 105 for pivotal motion about the vertical mounting pin 108. The floor puller bar 105 also carries a pair of thin hydraulic cylinders 109 mounted to its front portion and between the upper and lower plate members thereof.

Figure 11:
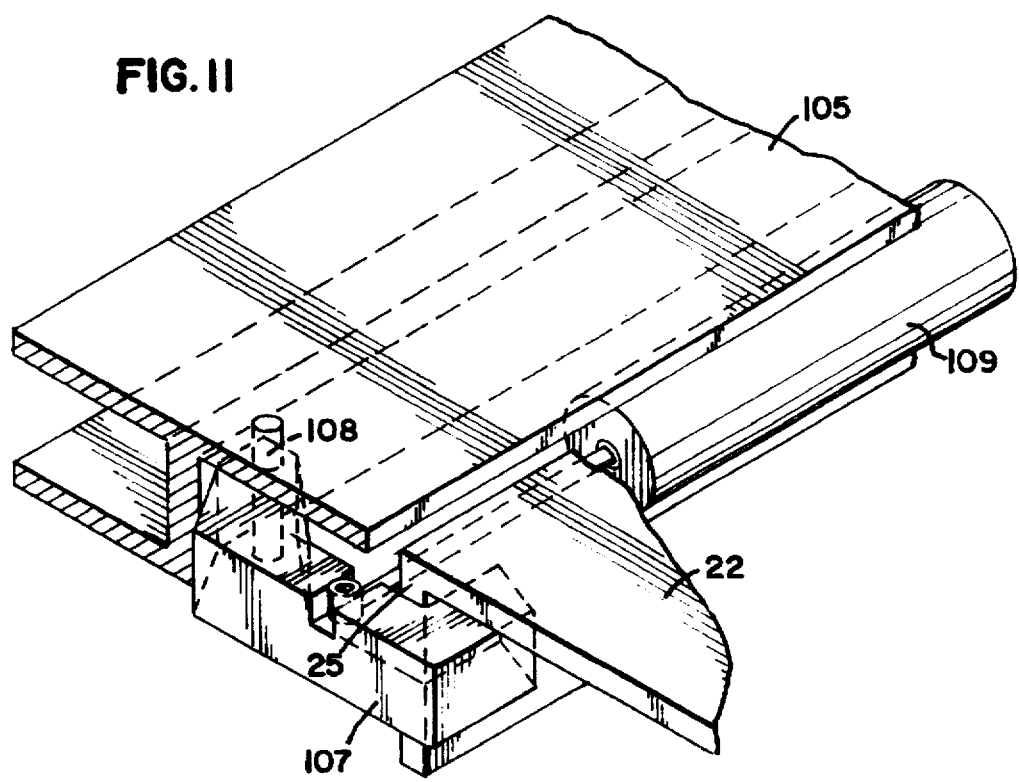
FIG. 11 is an enlarged perspective view of one of the coop floor engaging actuator members of the carriage assembly of FIG. 5, illustrated as it would appear from a direction opposite to that shown in FIG. 5.

The piston arms of the respective hydraulic cylinders 109 are operatively pivotally connected (as illustrated in FIG. 11) to an arm portion of one of the floor engaging hook members 107 for pivotally moving the hook member 107 about the axis of its mounting pin 108 so that the forward hook portion of the hook member 107 can selectively engage and disengage from the downwardly projecting front lip 25 of a coop floor 22. The required rotational travel of the forward end of the hook members 107 is accommodated by the notches 25a formed in the downwardly projecting lip 25 of the coop floors 22 (see FIG. 8).

In the preferred embodiment, the front and rear frame members 86 are approximately 54 inches long, the platform 62 width is approximately 47 inches, and the length or depth of the coop floor is approximately 45 inches long. The L-shaped channel members of the movable carriage 85 are approximately 46 inches long, enabling the coop floors 22 to be fully withdrawn from their associated coops, until the rear walls 23 thereof force all of the turkeys carried by the floor 22 out of the confining side walls of the coop 15.

A pair of retaining stud members 110 (see FIG. 5) are secured to the C-channel support members 94 and act as retaining stop members for a back retaining wall member 112 which is supported by the upper cross brace support members 67 and extends along the length of each of the conveyor platform assemblies 40 and 41 to restrain the forward motion of turkeys as they are pulled out from their respective coops being unloaded. The retaining stud members 110 enable the movable carriage assembly 85 to slidably move relative to the back retaining walls 112 during the unloading operation. The back retaining walls 112 are spaced sufficiently up from the upper surface of the platform 62 and the conveyor belt 65 such that a coop floor 22 will pass therebeneath when it is operatively pulled out of a coop by the floor puller bar 105 and its associated floor-engaging hook members 107.

The upper channel trolley tracks 72 and 73 support a number of items that move with and/or relative to the movable carriage 85, but which are not directly supported by the carriage. The first of such items to be described is the pusher plate member 120 located at the left side of the carriage assembly, as illustrated in FIGS. 4, 5 and 7 which pushes turkeys off of a withdrawn coop floor 22 and onto the underlying moving conveyor belt 65. The pusher plate 120 is supported for movement along the channel trolley tracks 72 and 73 by means of support hangar arms, generally indicated at 122 (see FIG. 7). A pair of hydraulic cylinders 123 and 124 have their cylinder bodies mounted by means of a plurality of support hangar arms 125 for slidable movement within the channel trolley tracks 72 and 73 and are also secured by a pair of lower support brace members 126 to the leftmost C-channel support member 94. The piston arms of the hydraulic cylinders 123 and 124 are secured to the back surface of the pusher plate 120 for moving the pusher plate 120 in the longitudinal direction of the conveyor belt.

The upper trolley system also supports a turkey divider/ guide conveyor assembly, generally indicated at 130. The divider conveyor assembly 130 is supported from the overhead trolley tracks 72 and 73 by means of a plurality of hangar support arms 131 and a hydraulic lift cylinder 132. Cross brace members generally indicated at 133 in FIG. 4 provide structural lateral support for the hangar support arms 131 and the hydraulic lift cylinder 132. The vertical conveyor belt of the conveyor belt assembly 130 is moved by means of an electric motor 135 mounted to the cross brace members 133 and also carried by the overhead trolley tracks 72 and 73. The hydraulic lift cylinder 132 is operable to move the turkey divider conveyor assembly 130 between an operative "down" position as illustrated in FIGS. 4 and 7, and an "up" position located above the path of travel of the pusher plate 120 so as not to interfere with the motion or operation of the pusher plate 120, as hereinafter described in more detail.

The carriage assembly 85 also includes a door lifting structure for engaging and lifting the coop door or gate 19 of a coop 15 which is to be unloaded. The gate opening assembly includes an inverted U-shaped frame structure having side channel members 140 upwardly extending from and secured to the front frame member 86 of the movable carriage assembly 85, and connected at their top ends by means of a cross bar support member 141. The side channel members 140 and the cross bar support member 141 lie in a plane generally parallel to and immediately adjacent the front edges of the stacked coop assembly, as illustrated in FIG. 4. An angular brace member 142 extending from one of the side channel members 140 near the left side of the carriage assembly to the left C-channel support member 94 provides additional structural support for the 140, 141 frame structure. The side channel members 140 have longitudinal slots along their inwardly facing edges, for slidably receiving the outer edges of a transverse support bar 150 therein, as well as the outer ends of an operator control rod 151 (see FIGS. 9 and 10). The transverse support bar 150 is mounted for vertical movement within the slots of the side channel members 140 by means of a pair of hydraulic lift cylinders 152 and 153. In the preferred embodiment, the hydraulic lift cylinders 152 and 153 are double-acting lift cylinders, having their cylinder bodies secured to the upper cross bar support member 141, and the movable ends of their pistons respectively secured to the movable transverse support bar 150. The hydraulic lift cylinders 152 and 153 operate in unison to uniformly raise or lower the transverse support bar 150 along and as guided by the slots within the side channel members 140. An operator hydraulic cylinder 155 (FIGS. 9 and 10) has its cylinder end pivotally mounted to the transverse support bar 150, and its piston member 155a pivotally connected to an offset portion 151a of the operator control rod 151. The operator control rod 151 is rotatably mounted for movement about the axis 160 by a pair of bearing arms 156 extending downwardly from the transverse support bar 150 (see FIG. 9). The opposing ends of the operator control rod 151 slidably ride within the vertical slots of the side channel members 140, and are also restrained for rotational motion about the axis 160 by such slots. A pair of gate lifter arms 158 are pivotally mounted at their upper ends to the transverse support bar 150. The operator control rod 151 has second and third offset areas (generally designated at 151b and 151c respectively) adjacent its outer ends, which are pivotally connected by bearing mounts on their outer surfaces of the two gate lifter arms 158, as indicated in FIGS. 9 and 10. The gate lifter arms 158 further each has a lower transverse hook member 158a which projects in a direction away from the movable carriage 85 and toward the coop assembly. The gate lifter arm hook member 158 is designed and configured to slide beneath the bottom of the coop gate member 19 and to vertically lift the gate member 19 into an "open" position. The operator control rod 151 is configured for rotation about the axis 160. When the hydraulic cylinder 155 has its piston 155a in a retracted position (see FIG. 10), the outer offset areas 151b of the operator control rod 151 will be positioned as shown at "A" in FIG. 10, causing the gate lift arm 158 to be positioned as illustrated in solid lines in FIG. 10, out of engagement with the coop gate 19. As the hydraulic cylinder 155 is activated so as to extend its piston rod 155a in the manner illustrated in FIG. 9, and in dashed lines in FIG. 10, the operator control rod 151 will be caused to rotate in a clockwise direction about its axis 160 (as viewed in FIG. 10), causing the outer offset areas 151b and 151c of the operator control rod 151 to move to the position illustrated at "B" in FIG. 10, thereby causing the gate lifter arm 158 to pivot from right to left as viewed in FIG. 10 and into lifting engagement under the gate member 19 of the coop 15. In this position, the gate lifter arms 158 will engage the bottom of the gate 19 and cause the gate 19 to lift in an upward "opening" manner when the transverse support bar 150 is lifted by means of the hydraulic lift cylinders 152 and 153.

Figure 13:
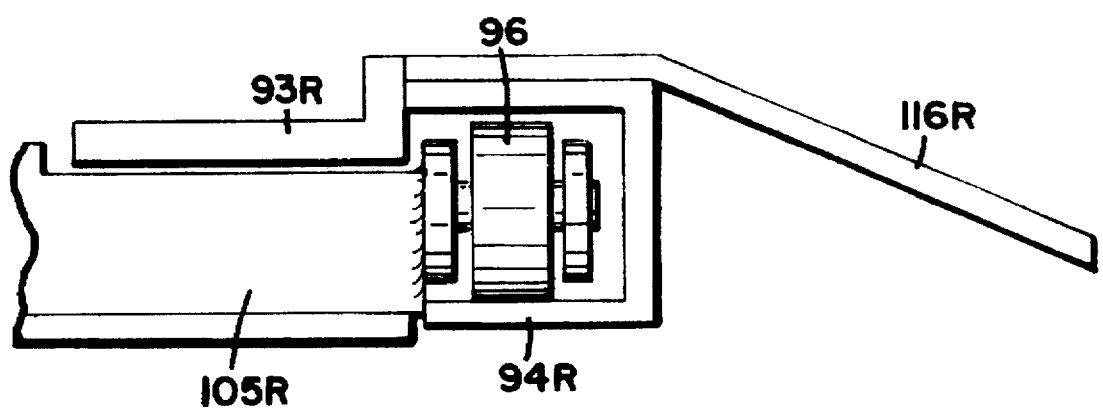
FIG. 13 is an enlarged partial cross-sectional view of the roller chain retaining channel member for the right side of the carriage assembly, illustrating the ramp slide for turkeys being unloaded onto the transport conveyor.

The carriage assembly 85 also includes a ramp member 116 projecting downwardly from the top of the foremost floor support member 93 and overlying the C-channel chain guide member 94, as illustrated in FIG. 13. The ramp 116 allows turkeys moving from the withdrawn coop floor 22 to the underlying moving conveyor 65 to do so gradually, without experiencing a sudden drop that could cause them to fall and/or injure themselves.

Figure 14:
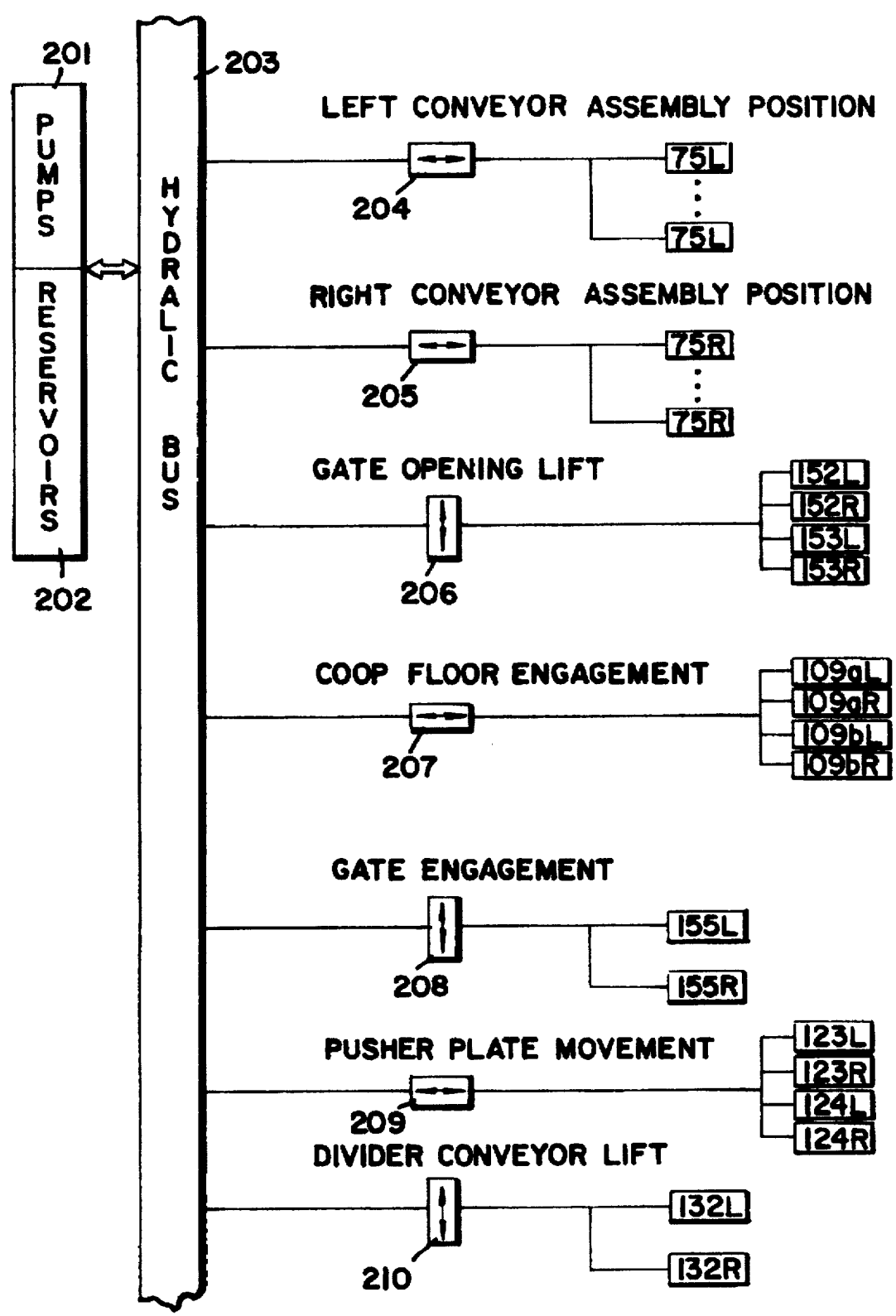
FIG. 14 is a functional schematic block diagram of the hydraulic networks for the coop unloading assembly of the preferred embodiment.

Operation of the various hydraulic cylinders described above with respect to the preferred embodiment implementation of the invention are appropriately connected to and controlled by a hydraulic system, generally diagrammatically illustrated in FIG. 14. It will be understood that those skilled in the art can readily configure and arrange the physical components required to implement the hydraulic functional blocks illustrated. Referring to FIG. 14, the hydraulic pumps and reservoirs needed to supply the various hydraulic components with hydraulic fluid are generally illustrated at 201 and 202 respectively. The number and type of such pumps and reservoirs required will depend upon the particular selection and arrangement of hydraulic cylinders and other components used throughout the system. As illustrated in FIG. 14, the pumps and reservoirs are illustrated as communicating with a hydraulic bus line, generally indicated at 203. The individual hydraulic control members and hydraulic cylinders are operatively supplied from the hydraulic bus 203. The left conveyor assembly 41 is transversely moved into and out of engaging position with the stacked coops of a load by means of a plurality of hydraulic cylinders, generally indicated at 75L which are respectively activated by means of a control module 204, operatively connected to the hydraulic bus 203. The right conveyor assembly module 40 is transversely moved into and out of engaging position with the stacked coops of a load by means of a plurality of hydraulic cylinders, generally indicated at 75R which are respectively activated by means of a control module 205, operatively connected to the hydraulic bus 203. The gate opening lift cylinders 152 and 153, which move the transverse support bar, 150 are activated by means of a control module 206, operatively connected to the hydraulic bus 203. The coop floor engagement cylinders 109a and 109b which control the floor engaging hook members 107 are activated by means of a control module 207, which is connected to the hydraulic bus 203. The gate engagement actuator cylinders 155, which rotate the operator control rod 151 are actuated by means of a control module 208 which is connected to the hydraulic bus 203. The cylinders 123 and 124 which are connected to the pusher plate 120 are actuated by means of a control module 209, which is connected to the hydraulic bus 203. The divider conveyor lift cylinders 132 which move the turkey divider conveyor assembly 130 are actuated by means of a control module 210, which is connected to the hydraulic bus 203.

Figure 15:
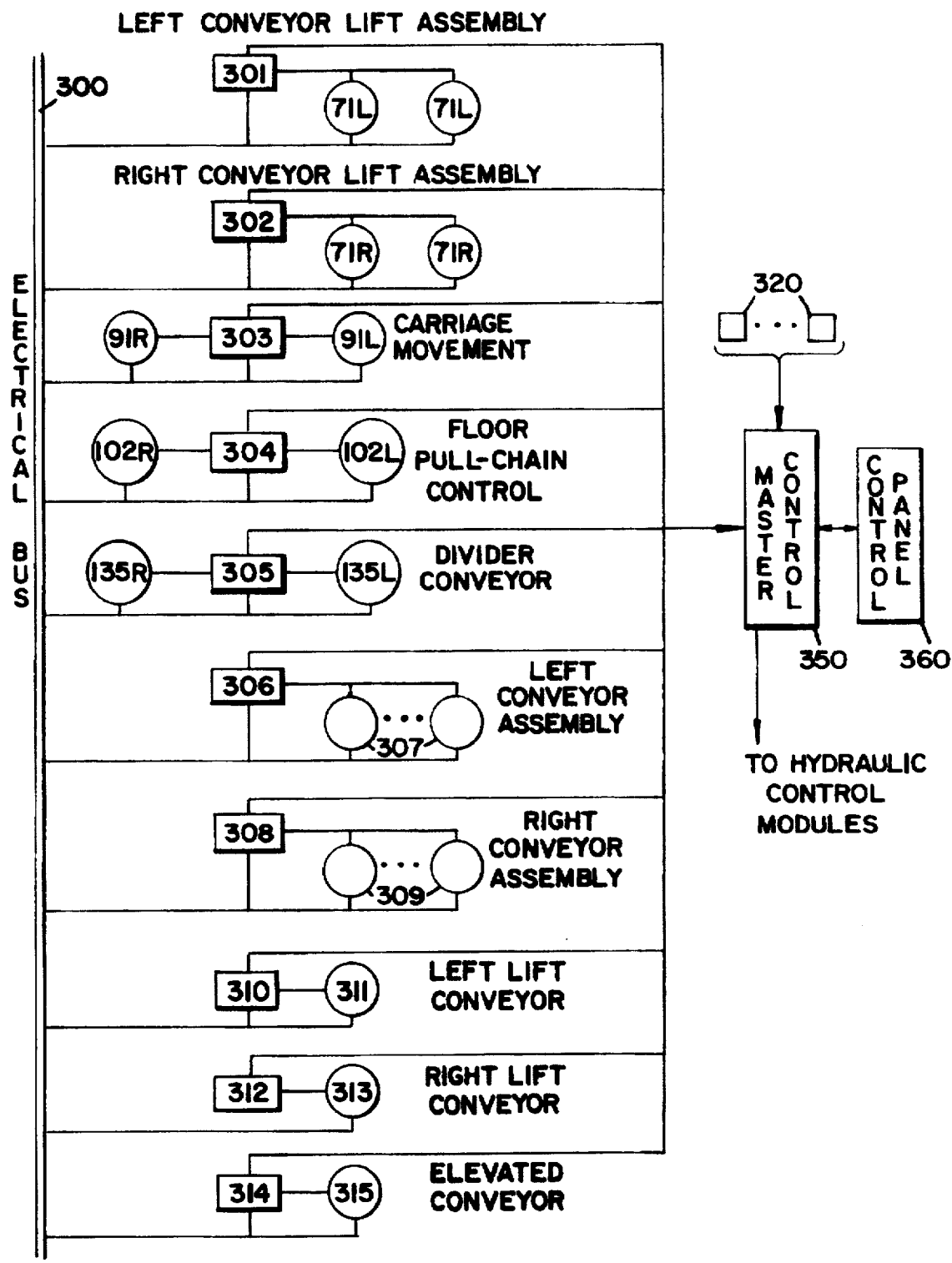
FIG. 15 is a functional block diagram of the electrical circuits for the coop unloading assembly of the preferred embodiment.

FIG. 15 provides a functional schematic block diagram of the various electrical components for providing motion and control functions for the preferred embodiment coop unloading assembly described above. It will be understood that such schematic implementation is only one way in which such electrical control and energization functions could be provided, and that those skilled in the art can readily implement the details of such electrical systems and the various components functionally described. It will be understood that electrical power is appropriately provided to all of the electrical components throughout the system from an electrical bus, generally indicated at 300. The left conveyor assembly 41 is operatively raised and lowered by one or more electric motors, generally illustrated at 71L, preferably through a counterbalancing technique which requires less actual motor power. The electric motors 71L are controlled by a switch control module 301. The right conveyor assembly 40 is raised and lowered by means of one or more electric motors, generally indicated at 71R, which are in turn controlled by a motor control module 302. The motors 71L and 71R raise and lower the left and right conveyor assemblies 41 and 40 respectively by means of the cable or chain members diagrammatically illustrated at 70 in FIG. 2. The motors 91 which are connected to drive the pinion wheels 88 on the rear sides of their respective carriages through the drive shafts 89 are energized by means of a control module 303. The motors 102 which move the roller chains 96 through the drive pulley and belt assemblies 100 and the drive shafts 99 are energized by means of a control module 304. The motors 135 which move the conveyors of the turkey divider conveyor assemblies 130 are energized by means of a control module 305. The primary conveyor belts such as the belts 65 which were described in some detail with respect to FIGS. 3–8, are the primary conveyor belts that move below the carriage assemblies 85 and which first receive the turkeys after they have been removed from the floors 22 of the coops 15. The conveyor belt 65L of the left conveyor assembly is moved through its drive pulleys 46L, 53L and 50L by means of one or more motors generally indicated at 307, which are energized by means of a control module 306. Similarly, the conveyor belt 65R for the right conveyor assembly 40 is moved by means of one or more motors generally indicated at 309 which are energized by means of a control module 308. The left lift conveyor 37 (FIG. 1) is moved by means of a motor 311 which is energized by means of a control module 310. The right lift conveyor 36 (FIG. 1) is moved by means of a motor 313 which is energized by means of a control module 312. The elevated conveyor 35 leading into the assembly plant is moved by means of a motor 315 which is energized by means of a control module 314. All of the control modules illustrated in FIG. 17, including modules 301–306 and 308, 310, 312 and 314 communicate respectively with a master control circuit or network, generally indicated at 350 which may also have associated with it an operator control panel, generally indicated at 360.

The master control 350 also communicates with a plurality of electrical limit switches, generally indicated at 320, which (while not illustrated in the mechanical figures of the Drawing) provide additional position control signals to the overall control function for indicating position and/or alignment for the various moving parts of the system. For example, such limit switches 320 might include switches associated with the control modules 301 and 302 for determining the exact elevation or height of the left and right conveyor assemblies 41 and 40 relative to the stacked coops on a transport truck. They might also include limit switches associated with the movable carriages 85 for determining their exact longitudinal position along their associated gear track strips 80 and 81 for accurately aligning the carriage assemblies with individual coops prior to an unloading operation thereof. There might also be limit switches associated with the control module 304 for determining the exact position of the floor engagement and pulling assemblies as the roller chains are moved to pull the floor out of a coop or to push it back into a coop following a loading operation. Limit switches are also contemplated for use in association with the control modules 204 and 205 for hydraulic cylinder control in determining exact lateral positioning of the left and right conveyor assembly modules 41 and 40 respectively relative to the stacked coop load on a transport truck.

Limit switches are also contemplated for use with the gate opening lift control module 206 for determining when the coop gates have been fully opened. Limit switches are also contemplated for use with the control module 209 for moving the pusher plates 120 for determining the proper relative travel of the pusher plates with respect to their respective carriage assemblies 85. Also, limit switches are contemplated for use with the lifting and lowering of the divider conveyors by means of the control module 210, to indicate proper lifting and lowering positions of the conveyor assemblies. These and other possible uses for limit switches 320 for providing positional information to the master control 350 will be readily appreciated by those skilled in the art. Such master control, as indicated by the functional block 350, could simply be a plurality of operator switches which would provide operator control for each of the individual electrical and hydraulic functions indicated in FIGS. 14 and 15. Alternatively, the master control 350 might represent a more automated configuration that can be implemented and is well within the knowledge of one skilled in the art of control system design.

In operation, the transport truck 10 is driven into the unloading dock area of the processing plant and is appropriately positioned by way of wheel alignment markers or the like centrally of the unloading station, and in general operative position relative to the left and right conveyor assemblies 41 and 40 respectively. Simultaneously with the entry of the truck into the unloading station, or prior thereto, the left and right conveyor assemblies 41 and 40 are lowered by means of their associated motors 71L and 71R respectively and the cable assemblies 70 such that the tops of the conveyor belts 65 thereof are generally positioned at a height slightly lower than the level of the floors 22 of the bottom coops of the stacked coop load to be unloaded. Also simultaneously with the entry of the truck into the unloading station, or prior thereto, the movable carriage assemblies 85 carried by the left and right conveyor assemblies are transversely moved therealong by means of their respective motors and associated pinion wheels 88 to the "front" of the transport load, for general alignment with the foremost lower coops 15 on either side of the load.

Figure 12:
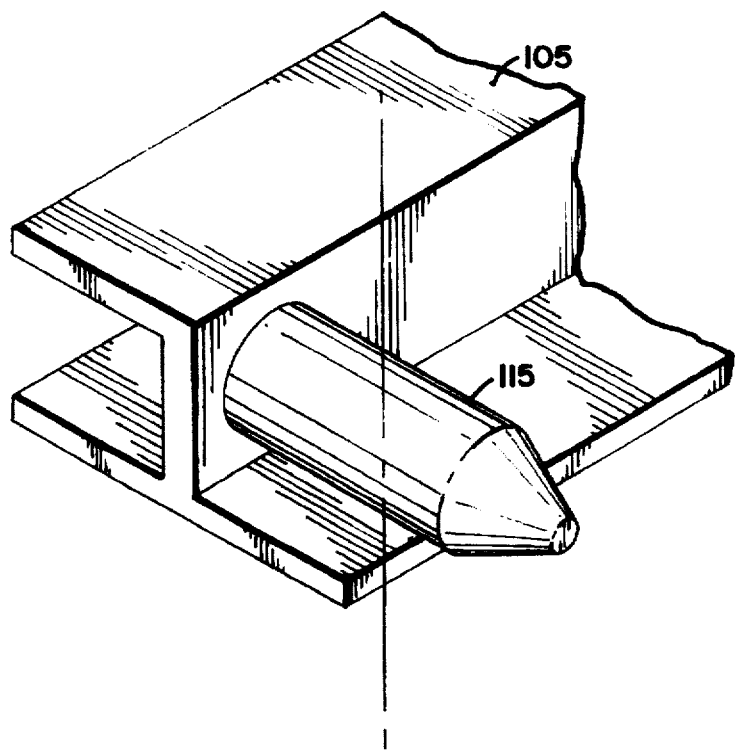
FIG. 12 is an enlarged perspective view of one of two alignment stud members positioned near and extending from the coop floor pulling apparatus of the carriage assembly, for accurately aligning the carriage assembly with the coop to be emptied.

When the transport truck is properly positioned in the unloading station, the left and right conveyor assemblies 41 and 40 respectively are moved into unloading position directly addressing the gate sides of the lowermost row of coops on each side of the transport load, by means of the hydraulic cylinders 75L and 75R. If further vertical alignment positioning is required, as may be indicated by appropriate limit switches, the lift motors 71L and 71R are appropriately energized to provide the proper vertical alignment of the left and right conveyor assemblies. The roller chain drive motors 102 are then energized so as to move their respective roller chains 96 and their connected floor puller bars 105 and floor engaging hook members 107 toward the coops with which they are generally aligned. As the floor puller bar members 105 approach their foremost travel position, the alignment pins 115 (FIG. 12) at the opposite ends of the puller bar members 105, and any associated limit switches, engage the upright end post bars 30 of the coop 15 being addressed, to provide accurate alignment of the movable carriages 85 relative to the coop to be unloaded. After the proper alignment has been attained, the hydraulic cylinders 109 are energized so as to move the floor engaging hook members 107 into hooking engagement with the downwardly projecting forward lips 25 of the floors of those coops being addressed by the movable carriages 85.

The hydraulic cylinders 152 and 153 are energized to lower the transverse support bars 150 of the gate opening apparatus to their lowermost positions, such that the hook members 158a of the gate lifter arms 158 are aligned below the lowermost edge of the gates 19 of the addressed coops 15. The actuator cylinders 155 are then energized so as to extend the cylinder pistons, thereby rotating the operator control rods 151 about their axes 160, thereby moving the hook members 158a of the gate lifter arms 158 under and into engagement with the bottom surfaces of the gates 19 being addressed thereby. The control module 206 is then activated so as to energize the gate opening lift cylinders 152 and 153 so as to raise the transverse support bars 150 and their associated gate lifter arms 158, thereby lifting the associated engaged gate members 19 to their "open" positions. At this point, the turkeys within the coops 15 being unloaded are on the floor 22 of the coop and are still positioned within the confines of the surrounding walls of the coop. Also at this time, the pusher plates 120 are positioned in their retracted positions as illustrated in FIGS. 4 and 5, and the divider conveyor belt assemblies 130 are positioned in their operative "down" positions as illustrated in FIG. 4 with their conveyor belts moving. It is also understood, that during this operation, or at some time before the actual removal of turkeys from the coops, that the primary conveyor belts of the left and right conveyor assemblies, as well as the lift conveyor belts 36 and 37 and the elevated conveyor belt 35 are operatively moving.

After the coop gates being addressed by the two movable carriages 85 have been lifted to their "open" positions, the motors 102 are energized to pull the roller chains 96 back toward the rear of their respective carriage assemblies, thereby retracting the floor puller bar members 105 and their associated floor engaging hook members 107, withdrawing the coop floors 22 to which they are engaged out of their respective coops. The floors 22 are pulled out their full length, such that their forward edges which are engaged by the floor engaging hook members 107 actually extend in a rearward direction beyond the retaining wall 112 (see FIG. 4) The floors 22 are guided and supported by and ride within the channel members 93 of the carriage assembly. The back wall members 23 of the floors 22 ensure that the turkeys carried by a floor 22 will remain on the floor as it is withdrawn from the coop, and will not reenter the coop which is being emptied. As the floors 22 are withdrawn from the coops, a portion of the turkeys located on the right side of such floor as viewed in FIG. 4, will come into engagement with the vertical divider conveyor 130 and will be guided toward and onto the underlying moving conveyor belt 65. The divider conveyor 130 is positioned in the preferred embodiment relative to the opening of the coop being unloaded, so as to engage approximately one-half of the turkeys being pulled out from the coop. The remaining half of the turkeys will pass by and behind the divider conveyor 130 as the floor of the coop continues to be withdrawn from the coop. As the floors being withdrawn approach their maximum withdrawal position, the lift cylinders 132 are energized so as to raise the divider conveyor assemblies 130 in an arcuate path up and out of the way of the turkeys positioned behind the conveyor. Simultaneously, the pusher plate cylinders 123 and 124 are energized to move the pusher plates 120 (from left to right as viewed in FIG. 4) thereby pushing the turkeys remaining on the withdrawn coop floors off of the floors and onto the underlying moving conveyors 65. When all of the turkeys have been unloaded from the floors, the pusher plates 120 are withdrawn back to their original positions, the divider conveyors 130 are relowered to their operative positions and the floors 22 are pushed back into their empty coops. Simultaneous with the reinsertion of the empty coop floors into the empty coops, the gate engagement cylinders 155 are activated to withdraw their pistons, thereby rotating the operator control rods 151 about their axes 160 so as to release the hook portions 158a of the gate lifter arms 158 from the lifted gate members which they had previously engaged. The gate members that had been previously lifted, will remain in their open positions.

When the coop floors 22 are repositioned within their coops, the cylinders 109 are energized so as to release their associated floor engaging hook members 107 from the empty coop floors, and the floor puller bars 105 are retracted several inches back into their movable carriage assemblies 85 such that the hook members 107 do not interfere with movement of the carriage assemblies to the next coop position. Simultaneously with the indexing of the movable carriages to their next position, the gate opening lift cylinders 152 and 153 will be energized to lower the transverse support bars 150 and their associated gate lifter arms 158 for opening of the gates of the next coop to be unloaded. This process is repeated until all of the coops at the lower level have been emptied.

When the entire first row or level of coops have been emptied, the movable carriages of the left and right conveyor assemblies will return back to their initial positions adjacent the front of the transport truck, and the lift motors 71L and 71R will be energized to raise the left and right conveyor assemblies 41 and 40 into alignment with the second coop level, for emptying the coops positioned at that level. The entire process is repeated until all of the coops at all levels have been emptied of their contents. When the entire transport truck load of coops has been emptied, the hydraulic cylinders 75L and 75R will be energized to withdraw the left and right conveyor assemblies from their respective unloading alignment with the transport truck load so that the transport truck can be driven out of the unloading station. It is anticipated that an alignment and unloading operation for each coop unloaded by a carriage assembly will take less than a minute and possibly as little as 40 seconds.

It will be understood that turkeys unloaded as described above from their respective coops, are carried by the respective conveyor belts 65 of the left and right conveyor assemblies and are deposited thereby onto the lift conveyors 36 and 37 for redeposit onto the elevated conveyor 35, which carries them into the processing plant.

It will be appreciated that the apparatus and method described for unloading turkeys from transport coops provides a safe, rapid and completely automatable process for performing the unloading operation.

While the invention has been described with respect to a preferred embodiment thereof, and with respect to specific types of components used therein it will be understood by those skilled in the art that the invention is not to be limited in any manner by the specifics of either the disclosed embodiment or the components described. Such embodiment and components have been described to illustrate clear examples of how the principles of the invention can be specifically applied. All alternatives and modifications of the foregoing are intended to be covered within the broad scope of the appended claims.

What is claimed is:

1. Carriage apparatus for unloading turkeys from a transport coop of the type having a movable gate for selectively opening and closing an access port into the coop and a floor slidably movable relative to the coop through the access port, comprising:
    (a) means for aligning said carriage apparatus in unloading position relative to said coop;
    (b) mechanical gate opening means for selectively engaging and moving said gate to open and close said access port of said coop;
    (c) mechanical floor engaging means for engaging and moving said floor out of and into said coop through said coop access port; and
    (d) mechanical means for urging turkeys carried by said floor off of said floor and onto an unloading receptor when said floor is positioned in an extended manner out of said coop and through said access port.

2. The carriage apparatus as recited in claim 1, wherein said carriage further includes means for supporting at least that portion of said floor that is moved out of said coop.

3. The carriage apparatus as recited in claim 1, wherein said carriage includes a plurality of wheels for movably supporting said carriage, and motor means operatively connected with at least one of said wheels for selectively moving said wheel.

4. The carriage apparatus as recited in claim 1, wherein said gate opening means includes one or more hydraulic cylinders.

5. The carriage apparatus as recited in claim 1, wherein said mechanical means for urging turkeys carried by said floor includes a ram movable in a direction transverse to that in which said floor moves, for urging turkeys laterally off of said floor.

6. The carriage apparatus as recited in claim 1, further including a ramp member operatively mounted to said carriage and aligned to lie between an edge of that portion of said floor disposed out of said coop, and said unloading receptor.

7. The carriage apparatus as recited in claim 1, further including upright divider means operatively disposed generally perpendicular to said floor and configured relative to said coop access port so as to engage a portion of turkeys carried by said floor as said floor is withdrawn from said coop and to urge said engaged turkeys toward said unloading receptor.

8. The carriage apparatus as recited in claim 7, wherein said upright divider means includes a vertically oriented conveyor.

9. The carriage apparatus as recited in claim 7, including positioning means operatively connected with said upright divider means for moving said divider means out of a path of travel of said mechanical urging means.

10. The carriage apparatus as recited in claim 9, wherein said positioning means is operable to lift said upright divider means out of said path of travel of said mechanical urging means.

11. The carriage apparatus as recited in claim 7, wherein said upright divider means is arranged and configured to intercept approximately half of the turkeys carried by said floor as said floor is moved out of said coop.

12. A method of unloading turkeys from a transport coop of the type having an openable gate closing an access port into the coop and a floor slidably removable from the coop through said access port, comprising the steps of:
    (a) aligning an unloading carriage assembly with the access port of a first coop containing turkeys to be unloaded;
    (b) opening the gate of said first coop by means carried by said carriage assembly, to open said access port of said coop;
    (c) engaging and moving the first coop floor in a removal direction through said open access port of the first coop, by means carried by said carriage assembly; and
    (d) pushing turkeys carried by said moved first coop floor off of the floor and onto an unloading receptor.

13. The method as recited in claim 12, wherein the step of opening said coop gate comprises the steps of engaging and lifting said gate above said access port of said first coop.

14. The method as recited in claim 12, further including the step of intercepting a portion of the turkeys carried by said moving first coop floor as said floor is being moved out of said coop and urging said intercepted turkeys from said floor and onto said unloading receptor.

15. The method as recited in claim 12, including the step of moving said first coop floor back through said access port and into said coop once all of the turkeys carried thereby have been removed from the floor onto said unloading receptor.

16. The method as recited in claim 15, including the step of moving said unloading carriage assembly for alignment with the access port of a second coop containing turkeys to be unloaded, after said floor of said first coop has been moved back into the first coop.

17. The method as recited in claim 16, wherein the step of moving said unloading carriage assembly includes energizing a motor for selectively moving a wheel of said carriage assembly.

18. A turkey unloading apparatus for automatically unloading turkeys from a transport load of turkey coops stacked in ordered rows and columns, said coops being of the type having a movable gate for selectively opening and closing an access port into the coop and a floor slidably movable relative to the coop through the access port, said unloading apparatus comprising:

(a) a conveyor apparatus having an unloading conveyor extending generally a length of the rows of coops comprising the transport load;

(b) conveyor positioning means operatively connected with said conveyor apparatus for selectively raising and lowering said conveyor apparatus relative to a height of said transport load;

(c) a movable carriage assembly operatively connected to said conveyor apparatus and longitudinally movable therealong, said carriage assembly comprising:

(i) transport means for movably supporting said carriage assembly on said conveyor apparatus;

(ii) means operatively connected with said transport means for aligning said carriage assembly in unloading position relative to a selected coop of said transport load;

(iii) gate opening means for selectively engaging and moving said gate to open and close said access port of said selected coop;

(iv) floor engaging means for engaging and moving said floor out of and into said selected coop through said coop access port; and (v) mechanical means for urging turkeys carried by said selected coop floor off of said floor and onto said unloading conveyor, when said floor is positioned in an extended manner out of said coop and through said access port thereof.

19. The unloading apparatus of claim 18, wherein said conveyor apparatus includes a pair of tracks laterally disposed along said conveyor apparatus on either side of said unloading conveyor, and wherein said transport means of said carriage assembly includes a plurality of wheels arranged and configured to ride on said tracks.

20. The unloading apparatus of claim 18, wherein said carriage assembly includes means for supporting at least that portion of said selected coop floor that is moved out of said coop.

21. The unloading apparatus of claim 20, wherein said carriage assembly means for supporting said floor is disposed in overlying but spaced manner relative to said unloading conveyor.

22. A method of automatically unloading turkeys from a transport load of turkey coops stacked in ordered rows and columns, said coops being of the type having a movable gate for selectively opening and closing an access port into the coop and a floor slidably movable relative to the coop through the access port, said method comprising the steps of:

(a) vertically positioning a conveyor apparatus having an unloading conveyor extending generally a length of the rows of coops, such that an upper surface of the unloading conveyor is disposed adjacent to the access ports of a selected row of coops to be unloaded, and slightly below the general planes of the floors of the coops of said selected row;

(b) moving an unloading carriage assembly longitudinally along the conveyor apparatus and into unloading proximity with a first one of the coops in said selected row of coops to be unloaded;

(c) opening the gate of said first coop by means carried by said carriage assembly, to open said access port of said first coop;

(d) engaging and moving the coop floor of said first coop in a removal direction through said open access port by means carried by said carriage assembly; and (e) pushing turkeys carried by said moved floor of said first coop off of said floor and onto said unloading conveyor.

23. The method as recited in claim 22, including the step of moving said floor of said first coop back through the access port of said first coop and into said first coop once all of the turkeys carried thereby have been removed from the floor onto said unloading conveyor.

24. The method as recited in claim 23, including the step of moving said carriage assembly for alignment with the access port of a second coop of said selected row and repeating the unloading steps of claims 22 and 23 until said second coop has been emptied.

25. The method as recited in claim 23, including the step of successively moving said carriage assembly for alignment with the access ports of successively aligned coops of the selected row and of repeating the unloading steps of claims 22 and 23 until all of the coops of said selected row have been unloaded.

26. The method as recited in claim 25, including the step of moving said conveyor apparatus into unloading alignment with a second selected row of coops of said load to be unloaded.

27. The method as recited in claim 26, including repeating the unloading steps as recited in claims 22 through 26 until all of the rows of coops of said transport load have been unloaded.

28. The method as recited in claim 27, including the steps of unloading the lowermost row of the transport load first, and progressively unloading successively higher rows of the transport load.

* * * * *